US 011438231B2

(12) United States Patent
Gardner et al.

(10) Patent No.: US 11,438,231 B2
(45) Date of Patent: Sep. 6, 2022

(54) CENTRALIZED PLATFORM MANAGEMENT FOR COMPUTING ENVIRONMENTS

(71) Applicant: MicroStrategy Incorporated, Vienna, VA (US)

(72) Inventors: Richard Gardner, Leesburg, VA (US); Clayton Myers, Oak Hill, VA (US); Andrew Smith, Oakton, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/582,874

(22) Filed: Sep. 25, 2019

(65) Prior Publication Data
US 2021/0092015 A1 Mar. 25, 2021

(51) Int. Cl.
| | |
|---|---|
| *H04L 41/0853* | (2022.01) |
| *H04L 41/0893* | (2022.01) |
| *H04L 41/08* | (2022.01) |
| *H04L 41/0816* | (2022.01) |
| *H04L 41/084* | (2022.01) |
| *G06F 9/54* | (2006.01) |

(52) U.S. Cl.
CPC ......... *H04L 41/0853* (2013.01); *G06F 9/54* (2013.01); *H04L 41/0816* (2013.01); *H04L 41/0846* (2013.01); *H04L 41/0876* (2013.01); *H04L 41/0893* (2013.01)

(58) Field of Classification Search
CPC ......... H04L 41/0853; H04L 41/0876; H04L 41/0816; H04L 41/0893; H04L 41/0863; H04L 41/0846
See application file for complete search history.

(56) References Cited

U.S. PATENT DOCUMENTS

| | | | |
|---|---|---|---|
| 5,758,071 | A | 5/1998 | Burgess et al. |
| 6,085,244 | A | 7/2000 | Wookey |
| 6,282,175 | B1 | 8/2001 | Steele et al. |
| 6,334,158 | B1 | 12/2001 | Jennyc et al. |
| 6,338,149 | B1 | 1/2002 | Ciccone, Jr. et al. |

(Continued)

OTHER PUBLICATIONS doc-archives.microstrategy.com [online], "Installation and Configuration Guide," Sep. 2018, retrieved Mar. 20, 2020, retrieved from URL <https://doc-archives.microstrategy.com/producthelp/10.11/manuals/en/InstallationConfig.pdf>, 527 pages.

(Continued)

*Primary Examiner* — Nam T Tran
(74) *Attorney, Agent, or Firm* — Fish & Richardson P.C.

(57) ABSTRACT

Methods, systems, and apparatus, including computer programs encoded on computer-readable storage media, for centralized platform management for multiple environments. In some implementations, a management system obtains configuration information for each of multiple computing environments. The management system stores the configuration information for the multiple computing environments in a repository and monitors actions that change configurations of the multiple computing environments. The management system provides an interface configured to provide information about the configurations of the multiple computing environments and to adjust the configurations of the multiple computing environments in response to input received through the interface.

19 Claims, 4 Drawing Sheets

(56) References Cited

U.S. PATENT DOCUMENTS

| | | |
|---|---|---|
| 6,339,795 B1 | 1/2002 | Narukar et al. |
| 6,449,739 B1 | 9/2002 | Landan |
| 6,473,794 B1 | 10/2002 | Guheen et al. |
| 6,691,067 B1 | 2/2004 | Ding et al. |
| 6,691,245 B1 | 2/2004 | DeKoning |
| 6,792,393 B1 | 9/2004 | Farel et al. |
| 6,816,871 B2 | 11/2004 | Lee |
| 6,934,934 B1 | 8/2005 | Baker et al. |
| 6,964,051 B1 | 11/2005 | Palaniappan |
| 6,993,747 B1 | 1/2006 | Friedman |
| 7,024,548 B1 | 4/2006 | O'Toole, Jr. |
| 7,035,919 B1 | 4/2006 | Eismann et al. |
| 7,047,177 B1 | 5/2006 | Eismann et al. |
| 7,051,098 B2 | 5/2006 | Masters et al. |
| 7,089,347 B2 | 8/2006 | Mogi et al. |
| 7,155,462 B1 | 12/2006 | Singh et al. |
| 7,197,559 B2 | 3/2007 | Goldstein et al. |
| 7,346,676 B1 | 3/2008 | Swildens et al. |
| 7,389,216 B2 | 6/2008 | Parent et al. |
| 7,523,447 B1 | 4/2009 | Callahan et al. |
| 7,552,438 B1 | 6/2009 | Werme et al. |
| 7,581,011 B2 | 8/2009 | Teng |
| 7,617,486 B2 | 11/2009 | Sharma et al. |
| 7,657,871 B2 * | 2/2010 | Velupillai ........... H04L 41/0846 717/121 |
| 7,784,049 B1 | 8/2010 | Gandler |
| 7,802,174 B2 | 9/2010 | Teng et al. |
| 7,917,617 B1 | 3/2011 | Ponnapur et al. |
| 7,937,655 B2 | 5/2011 | Teng et al. |
| 7,996,525 B2 * | 8/2011 | Stienhans ............. G06F 9/5083 709/224 |
| 8,024,299 B2 | 9/2011 | Dias et al. |
| 8,099,727 B2 | 1/2012 | Bahat et al. |
| 8,219,432 B1 | 7/2012 | Bradley et al. |
| 8,260,893 B1 * | 9/2012 | Bandhole ............. G06F 9/5083 709/223 |
| 8,285,681 B2 | 10/2012 | Prahlad et al. |
| 8,554,918 B1 | 10/2013 | Douglis |
| 8,583,769 B1 * | 11/2013 | Peters ................... H04L 12/42 709/221 |
| 8,595,364 B2 | 11/2013 | Levy et al. |
| 8,595,714 B1 | 11/2013 | Hamer et al. |
| 8,612,599 B2 | 12/2013 | Tung et al. |
| 8,732,604 B2 | 5/2014 | Okamoto et al. |
| 8,805,970 B2 | 8/2014 | Breh et al. |
| 8,819,171 B2 | 8/2014 | Chakraborty et al. |
| 8,892,954 B1 | 11/2014 | Gray et al. |
| 8,990,778 B1 | 3/2015 | Allocca et al. |
| 9,047,017 B1 | 6/2015 | Dolan et al. |
| 9,053,220 B2 | 6/2015 | Banks et al. |
| 9,110,496 B1 | 8/2015 | Michelsen |
| 9,164,874 B1 | 10/2015 | Tonnay et al. |
| 9,166,895 B1 | 10/2015 | Sivaraman |
| 9,189,294 B2 | 11/2015 | Considine et al. |
| 9,262,150 B2 | 2/2016 | Haserodt et al. |
| 9,268,663 B1 | 2/2016 | Siddiqui et al. |
| 9,270,449 B1 | 2/2016 | Tribble et al. |
| 9,311,161 B2 | 4/2016 | Jagtap |
| 9,367,305 B1 | 6/2016 | Kumar et al. |
| 9,424,172 B1 | 8/2016 | Helder |
| 9,436,535 B2 | 9/2016 | Ricken et al. |
| 9,491,072 B2 | 11/2016 | Raghunathan et al. |
| 9,531,604 B2 | 12/2016 | Akolkar et al. |
| 9,674,294 B1 | 6/2017 | Gonthier et al. |
| 9,716,624 B2 | 7/2017 | Zeyliger et al. |
| 9,733,921 B1 | 8/2017 | Saenz et al. |
| 9,762,450 B2 | 9/2017 | Xie |
| 9,766,962 B2 | 9/2017 | Dvir |
| 9,767,312 B2 | 9/2017 | Sahoo et al. |
| 9,811,849 B2 | 11/2017 | Bursey |
| 9,820,224 B2 | 11/2017 | Hui et al. |
| 9,928,210 B1 | 3/2018 | Zhang et al. |
| 9,959,104 B2 | 5/2018 | Chen et al. |
| 9,965,261 B2 | 5/2018 | Chen et al. |
| 9,986,427 B2 | 5/2018 | Kimpe |
| 10,002,247 B2 | 6/2018 | Suarez et al. |
| 10,007,509 B1 | 6/2018 | Quershi et al. |
| 10,169,023 B2 | 1/2019 | Ciano et al. |
| 10,191,778 B1 | 1/2019 | Yang et al. |
| 10,241,778 B2 | 3/2019 | Emeis et al. |
| 10,244,034 B2 | 3/2019 | Joshi et al. |
| 10,261,782 B2 | 4/2019 | Suarez et al. |
| 10,303,455 B2 | 5/2019 | Fitzgerald et al. |
| 10,310,949 B1 | 6/2019 | Chakraborty et al. |
| 10,318,280 B2 | 6/2019 | Islam et al. |
| 10,356,214 B2 | 7/2019 | Joshi et al. |
| 10,389,582 B1 | 8/2019 | Fakhouri et al. |
| 10,440,153 B1 | 10/2019 | Smith et al. |
| 10,452,440 B1 | 10/2019 | Odulinski et al. |
| 10,474,548 B2 | 11/2019 | Sanakkayala et al. |
| 10,803,411 B1 | 10/2020 | Smith et al. |
| 10,810,041 B1 | 10/2020 | Myers et al. |
| 10,997,052 B2 | 5/2021 | Khosrowpour et al. |
| 10,997,135 B2 | 5/2021 | Zoll et al. |
| 11,102,330 B2 | 8/2021 | Gardner et al. |
| 11,102,331 B2 | 8/2021 | Smith et al. |
| 2002/0065833 A1 | 5/2002 | Litvin |
| 2002/0122422 A1 | 9/2002 | Kenney et al. |
| 2002/0124243 A1 | 9/2002 | Broeksteeg et al. |
| 2002/0157089 A1 | 10/2002 | Patel et al. |
| 2002/0198985 A1 | 12/2002 | Fraenkel et al. |
| 2003/0135382 A1 | 7/2003 | Marejka et al. |
| 2004/0060044 A1 | 3/2004 | Das et al. |
| 2004/0068424 A1 | 4/2004 | Lee et al. |
| 2006/0129870 A1 | 6/2006 | Parent et al. |
| 2006/0236056 A1 | 10/2006 | Nagata |
| 2008/0077366 A1 | 3/2008 | Neuse et al. |
| 2008/0097960 A1 | 4/2008 | Dias et al. |
| 2008/0109448 A1 | 5/2008 | Aboel-Nil et al. |
| 2008/0115195 A1 | 5/2008 | Malek et al. |
| 2008/0163092 A1 | 7/2008 | Rao |
| 2008/0243660 A1 | 10/2008 | Amemiya et al. |
| 2008/0247314 A1 | 10/2008 | Kim |
| 2008/0301663 A1 | 12/2008 | Bahat et al. |
| 2009/0018996 A1 | 1/2009 | Hunt et al. |
| 2009/0063699 A1 | 3/2009 | Chapweske et al. |
| 2009/0070462 A1 | 3/2009 | Saenz et al. |
| 2009/0282401 A1 * | 11/2009 | Todorova ................. G06F 8/61 717/175 |
| 2010/0153780 A1 | 6/2010 | Kirtkow |
| 2010/0162406 A1 | 6/2010 | Benameur et al. |
| 2010/0250487 A1 | 9/2010 | Gabriel et al. |
| 2010/0318986 A1 | 12/2010 | Burke et al. |
| 2011/0054968 A1 | 3/2011 | Galaviz |
| 2011/0055823 A1 | 3/2011 | Nichols et al. |
| 2011/0099290 A1 | 4/2011 | Swildens et al. |
| 2011/0145525 A1 | 6/2011 | Browne et al. |
| 2011/0314344 A1 | 12/2011 | Okamoto et al. |
| 2012/0096149 A1 | 4/2012 | Sunkara et al. |
| 2012/0117620 A1 | 5/2012 | Cassidy |
| 2012/0167094 A1 | 6/2012 | Suit |
| 2012/0198279 A1 | 8/2012 | Schroeder |
| 2012/0310765 A1 | 12/2012 | Masters |
| 2013/0042123 A1 | 2/2013 | Smith et al. |
| 2013/0054792 A1 | 2/2013 | Sharaf |
| 2013/0080514 A1 | 3/2013 | Gupta et al. |
| 2013/0197863 A1 | 8/2013 | Rayate et al. |
| 2013/0297769 A1 | 11/2013 | Chang et al. |
| 2013/0311740 A1 | 11/2013 | Watanabe et al. |
| 2013/0339299 A1 | 12/2013 | Muller et al. |
| 2014/0019387 A1 | 1/2014 | Cao et al. |
| 2014/0020048 A1 | 1/2014 | Snodgrass |
| 2014/0089033 A1 | 3/2014 | Snodgrass |
| 2014/0089505 A1 | 3/2014 | Haserodt et al. |
| 2014/0156839 A1 | 6/2014 | Swildens et al. |
| 2014/0165063 A1 | 6/2014 | Shiva et al. |
| 2014/0282456 A1 | 9/2014 | Drost et al. |
| 2014/0331209 A1 | 11/2014 | Singh |
| 2014/0331225 A1 | 11/2014 | Helander et al. |
| 2014/0358944 A1 | 12/2014 | Brower, Jr. et al. |
| 2015/0019195 A1 | 1/2015 | Davis |
| 2015/0019197 A1 | 1/2015 | Higginson |
| 2015/0019488 A1 | 1/2015 | Balch et al. |
| 2015/0019706 A1 | 1/2015 | Raghunathan et al. |

(56) References Cited

U.S. PATENT DOCUMENTS

| | | | |
|---|---|---|---|
| 2015/0081574 A1 | 3/2015 | Selby et al. |
| 2015/0089479 A1 | 3/2015 | Chen et al. |
| 2015/0095892 A1 | 4/2015 | Baggott et al. |
| 2015/0100829 A1 | 4/2015 | Nanjundappa et al. |
| 2015/0178052 A1 | 6/2015 | Gupta et al. |
| 2015/0220426 A1 | 8/2015 | Spektor et al. |
| 2015/0242636 A1 | 8/2015 | Khan et al. |
| 2015/0295792 A1 | 10/2015 | Cropper et al. |
| 2015/0326432 A1 | 11/2015 | Fujie et al. |
| 2015/0373097 A1 | 12/2015 | Konkus et al. |
| 2016/0026555 A1 | 1/2016 | Kuo et al. |
| 2016/0044040 A1 | 2/2016 | Caffary, Jr. |
| 2016/0055067 A1 | 2/2016 | Bensinger |
| 2016/0072730 A1 | 3/2016 | Jurban et al. |
| 2016/0132320 A1 | 5/2016 | Fitzgerald et al. |
| 2016/0139887 A1 | 5/2016 | Pudiyapura et al. |
| 2016/0164738 A1 | 6/2016 | Pinski et al. |
| 2016/0277249 A1* | 9/2016 | Singh | H04L 43/12 |
| 2016/0335106 A1 | 11/2016 | Behere et al. |
| 2016/0335108 A1 | 11/2016 | Ryu et al. |
| 2016/0337186 A1* | 11/2016 | Dolinsky | H04L 41/0853 |
| 2016/0344610 A1 | 11/2016 | Robinette |
| 2016/0350205 A1 | 12/2016 | Acharya et al. |
| 2016/0371170 A1 | 12/2016 | Salunke et al. |
| 2017/0041201 A1 | 2/2017 | Ilyadis et al. |
| 2017/0061313 A1 | 3/2017 | Oros et al. |
| 2017/0090972 A1 | 3/2017 | Ryu et al. |
| 2017/0147319 A1 | 5/2017 | Riek et al. |
| 2017/0154017 A1 | 6/2017 | Kristiansson et al. |
| 2017/0177860 A1 | 6/2017 | Suarez et al. |
| 2017/0185488 A1 | 6/2017 | Kumarasamy et al. |
| 2017/0270455 A1 | 9/2017 | Chi et al. |
| 2017/0295199 A1* | 10/2017 | Kirti | H04L 63/1416 |
| 2017/0300311 A1 | 10/2017 | Lopez et al. |
| 2017/0315795 A1 | 11/2017 | Keller |
| 2018/0013616 A1 | 1/2018 | Abadi et al. |
| 2018/0075086 A1 | 3/2018 | Yam et al. |
| 2018/0088926 A1 | 3/2018 | Abrams |
| 2018/0088935 A1 | 3/2018 | Church et al. |
| 2018/0095778 A1 | 4/2018 | Aydelott et al. |
| 2018/0095973 A1 | 4/2018 | Huang et al. |
| 2018/0136931 A1 | 5/2018 | Hendrich et al. |
| 2018/0157516 A1 | 6/2018 | Kristiansson et al. |
| 2018/0173502 A1 | 6/2018 | Biskup et al. |
| 2018/0173522 A1 | 6/2018 | Hamill et al. |
| 2018/0205652 A1 | 7/2018 | Saxena |
| 2018/0267908 A1 | 9/2018 | Pan et al. |
| 2018/0285199 A1 | 10/2018 | Mitkar et al. |
| 2018/0285210 A1 | 10/2018 | Mitkar et al. |
| 2018/0285246 A1 | 10/2018 | Tuttle et al. |
| 2018/0285353 A1 | 10/2018 | Rao et al. |
| 2018/0287902 A1 | 10/2018 | Chitalia et al. |
| 2018/0288129 A1* | 10/2018 | Joshi | H04L 43/08 |
| 2018/0341471 A1 | 11/2018 | Stefanov et al. |
| 2019/0034313 A1 | 1/2019 | Vedurumudi et al. |
| 2019/0050680 A1 | 2/2019 | Waugh et al. |
| 2019/0095254 A1 | 3/2019 | Rao |
| 2019/0102204 A1 | 4/2019 | Khosrowpour et al. |
| 2019/0109822 A1 | 4/2019 | Clark et al. |
| 2019/0109857 A1 | 4/2019 | Caffary, Jr. |
| 2019/0132329 A1 | 5/2019 | Verberkt et al. |
| 2019/0163559 A1 | 5/2019 | Takahashi et al. |
| 2019/0208031 A1 | 7/2019 | Bennet et al. |
| 2019/0213068 A1 | 7/2019 | Upadhyay |
| 2019/0230130 A1 | 7/2019 | Beckman et al. |
| 2019/0235897 A1 | 8/2019 | Goel |
| 2019/0236844 A1 | 8/2019 | Balasian et al. |
| 2019/0260716 A1 | 8/2019 | Lerner |
| 2019/0278669 A1 | 9/2019 | Mueller-Wicke et al. |
| 2019/0288956 A1 | 9/2019 | Pulier et al. |
| 2019/0303541 A1 | 10/2019 | Reddy et al. |
| 2019/0312800 A1 | 10/2019 | Schibler et al. |
| 2019/0317829 A1 | 10/2019 | Brown et al. |
| 2019/0342425 A1 | 11/2019 | Cheng et al. |
| 2019/0354389 A1 | 11/2019 | Du et al. |
| 2019/0392045 A1 | 12/2019 | De Lima Junior et al. |
| 2020/0019393 A1 | 1/2020 | Vichare et al. |
| 2020/0067763 A1 | 2/2020 | Vytla |
| 2020/0081814 A1 | 3/2020 | Srinivasan et al. |
| 2020/0099773 A1 | 3/2020 | Myers et al. |
| 2020/0112624 A1 | 4/2020 | Smith et al. |
| 2020/0119979 A1 | 4/2020 | Woodland et al. |
| 2020/0135264 A1 | 4/2020 | Brady |
| 2020/0177634 A1* | 6/2020 | Hwang | G06N 5/025 |
| 2020/0204465 A1* | 6/2020 | Baker | H04L 43/0876 |
| 2020/0249962 A1 | 8/2020 | Vichare et al. |
| 2020/0257612 A1 | 8/2020 | Lang et al. |
| 2020/0272786 A1 | 8/2020 | Pandurangarao et al. |
| 2020/0293436 A1 | 9/2020 | Carames et al. |
| 2020/0356806 A1 | 11/2020 | Li et al. |
| 2020/0366572 A1 | 11/2020 | Chauhan |
| 2020/0394120 A1 | 12/2020 | Salmi et al. |
| 2021/0019321 A1 | 1/2021 | Ehrlich et al. |
| 2021/0042141 A1 | 2/2021 | De Marco et al. |
| 2021/0048995 A1 | 2/2021 | Myers et al. |
| 2021/0048998 A1 | 2/2021 | Myers et al. |
| 2021/0049002 A1 | 2/2021 | Myers et al. |
| 2021/0064262 A1 | 3/2021 | Myers et al. |
| 2021/0064492 A1 | 3/2021 | Myers et al. |
| 2021/0065078 A1 | 3/2021 | Gardner et al. |
| 2021/0067406 A1 | 3/2021 | Myers et al. |
| 2021/0067607 A1 | 3/2021 | Gardner et al. |
| 2021/0073026 A1 | 3/2021 | Myers et al. |
| 2021/0081298 A1 | 3/2021 | Gardner et al. |
| 2021/0089438 A1 | 3/2021 | Gardner et al. |
| 2021/0124610 A1 | 4/2021 | Gardner et al. |

OTHER PUBLICATIONS www2.microstrategy.com [online], "OperationsManager Guide" 2016, retrieved on Mar. 20, 2020 retrieved from URL <https://www2.microstrategy.com/producthelp/10.4/manuals/en/OperationsManager.pdf>, 154 pages.

U.S. Office Action in U.S. Appl. No. 116/556,636, dated Jun. 8, 2021, 7 pages.

U.S. Office Action in U.S. Appl. No. 16/557,482, dated Nov. 30, 2020, 13 pages.

U.S. Office Action in U.S. Appl. No. 16/787,596, dated Nov. 25, 2020, 11 pages.

U.S. Office Action in U.S. Appl. No. 17/005,657, dated Dec. 27, 2021, 33 pages.

Abbors et al., "An Automated Approach for Creating Workload Models from Server Log Data," 9th Intl Conf. on Software Engineering and Applications, 2014, 1-12.

Doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>, 2 pages.

docs.docker.com [online], "Get Started, Part 1: Orientation and setup," 2017, retrieved on Oct. 25, 2019, retrieved from URL<https://docs.docker.com/get-started/>, 6 pages.

Dyn.com "Kubernetes: The Difference Between Containers and Virtual Machines," Feb. 2018, retrieved on Oct. 25, 2019, retrieved from URL <https://dyn.com/blog/kubernetes-the-difference-between-containers-and-virtual-machines/>, 8 pages.

Edureka.co [online], "Docker tutorial—Introduction to docker & containerization," 2017, retrieved on October 25, 2019, retrieved from URL <https://www.edureka.co/blog/docker-tutorial>, 10 pages.

GWS Advisory [online], "What's New in Microstrategy 2019", Jan. 2019, retrieved on Oct. 8, 2021, retrieved from URL <https://www.gwsadvisory.com/wp-content/uploads/2019/01/whats-new-in-microstrategy-2019.pdf>, 138 pages.

Kubernetes.io [online], "Concepts underlying the cloud controller manager," May 2019, retrieved on Jun. 20, 2019, retrieved from URL <https://kubernetes.io/docs/concepts/architecture/cloud-controller/>, 9 pages.

Kubernetes.io [online], "StatefulSet is the workload API object used to manage stateful applications," Jun. 2019, retrieved on Jun. 20,

(56) References Cited

OTHER PUBLICATIONS 2019, retrieved from URL <https://kubernetes.io/docs/concepts/workloads/controllers/statefulset/>, 9 pages.

Linkedin.com [online], "Moving MicroStrategy to a docker/kubernetes infrastructure," Jan. 2018, retrieved from Oct. 25, 2019 retrieved from URL <https://www.linkedin.com/pulse/moving-microstrategy-dockerkubernetes-infrastructure-montero/>, 3 pages.

linuxize.com [online], "How To Remove Docker Containers, Images, Volumes, and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.

Ma et al., "Efficient service handoff across edge servers via docker container migration author:," 2017, SEC '17: Proceedings of the Second ACM/IEEE Symposium on Edge Computing, 11:1-13.

MicroStrategy [online], "MicroStrategy 10.9 Readme", 2017, retrieved on Oct. 5, 2021, 124 pages.

MicroStrategy [online], "System Administration Guide", 2018, retrieved on Oct. 5, 2021, 831 pages.

MicroStrategy [online], "Tools to Upgrade with Confidence", Feb. 4, 2019, retrieved on Oct. 12, 2021, 26 pages.

MicroStrategy [online], "Upgrade Guide—Upgrading your MicroStrategy Enterprise Software", Jun. 2016, retrieved on Oct. 8, 2021, retrieved from URL <https://doc-archives.microstrategy.com/producthelp/10.4/manuals/en/UpgradeGuide.pdf>, 109 pages.

MicroStrategy [online], "Upgrade Guide—Version 10", 2015, retrieved on Oct. 8, 2021, retrieved from URL <https://doc-archives.microstrategy.com/producthelp/10/manuals/en/UperadeGuide.pdf>, 118 pages.

MicroStrategy [online], "Upgrade Guide—Version 10. 9", Sep. 2017, retrieved on Oct. 8, 2021, retrieved from URL <https://www2.microstrategy.com/producthelp/10.9/manuals/en/UpgradeGuide.pdf>, 90 pages.

MicroStrategy [online], "Upgrade Guide—Version 10.11", Jun. 2018, retrieved on Oct. 8, 2021, retrieved from URL <https://www2.microstrategy.com/producthelp/10.11/manuals/en/UpgradeGuide.pdf>, 92 pages.

MicroStrategy.com [online],"Microstrategy on Kubernetes," 2017, retrieved on Oct. 25, 2019, retrieved from URL <https://www.microstrategy.com/getmedia/d99b44dc-ec44-451b-a5a3-3db7160282f0/Genesys-How-to-run-MicroStrategy-on-Kubernetes>, 10 pages.

Pederson, "Testing SharePoint Apps in Production (Canary Release)", Simon J.K. Pedersen's Azure & Docker blog, 2014, 1-9.

Singh et al., "Container-based microservice architecture for cloud applications," May 2017, 2017 International Conference on Computing, Communication and Automation (ICCCA), 847-52.

Stackoverflow.com [online] "What's the difference between ClusterIP, NodePort and LoadBalancer service types in Kubernetes?" Jan. 2017, retrieved from URL <https://stackoverflow.com/questions/41509439/whats-the-difference-between-clusterip-nodeport-and-loadbalancer-service-types/52241241#52241241>, 6 pages.

Tao el al., "Dynamic Resource Allocation Algorithm for Container-based Service Computing"; 2017 IEEE 13th International Symposium on Autonomous Decentralized Systems—2017 IEEE, 61-67.

Tuton, "Deploy A MongoDB replica set using the IBM Cloud Kubernetes Service," IBM Developer, Mar. 15, 2018, 14 pages.

U.S. Office Action in U.S. Appl. No. 17/028,565, dated Oct. 22, 2021, 9 pages.

U.S. Office Action in U.S. Appl. No. 16/542,023, dated Mar. 12, 2021, 15 pages.

U.S. Office Action in U.S. Appl. No. 16/557,713, dated Aug. 5, 2021, 39 pages.

U.S. Office Action in U.S. Appl. No. 16/557,713, dated Feb. 24, 2021, 34 pages.

U.S. Office Action in U.S. Appl. No. 16/557,713, dated Nov. 13, 2020, 25 pages.

Wikipedia.org [online], "Docker(software)," Mar. 2013, retrieved on Oct. 25, 2019, retrieved from URL <https://en.wikipedia.org/wiki/Docker_(software)>, 8 pages.

Wikipedia.org [online], "OS-level virtualization," Aug. 2006, retrieved on Oct. 25, 2019, retrieved from URL <https://en.wikipedia.org/wiki/OS-level_virtualization> , 4 pages.

Wikipedia.org [online], "System Image," Feb. 2013, retrieved Oct. 25, 2019, retrieved from URL <https://en.wikipedia.org/wiki/System_image>, 2 pages.

Wong, "What's the Difference Between Containers and Virtual Machines?," Jul. 15, 2016, Electronic Design, retrieved from URL <http://electronicdesign.com/ dev-tools /what-s-difference-between-containers-and-virtualmachines>, 3 pages.

www.en.wikipedia.org [online], "Online Analytical Processing" Mar. 2018, retrieved on Mar. 19, 2020, retrieved from URL <https://en.wikipedia.org/wiki/Online_analytical_processing>, 14 pages.

www2.microstrategy.com [online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>, 2 pages.

Xu et al.; "Mining Container Image Repositories for Software Configuration and Beyond"; 2018 ACM/IEEE 40th International Conference on Soltware Engineering: New Ideas and Emerging Results—ICSE-NIER'18, May 27-Jun. 3, 2018, 4 pages.

* cited by examiner

Workstation - Environments

| | | | |
|---|---|---|---|
| | | | Q Search |

Settings 230

| | Value 242 | Last Modify 244 | RPI 246 |
|---|---|---|---|
| ▼ Cube Memory Governing For Attribute Element Indexes 232 | Multiple | 07/08 | 88 |
|    Aqueduct Prod 234 | ON | 06/011 | 95 |
|    Aqueduct Mirror 236 | ON | 06/011 | 95 |
|    Aqueduct Dev 238 | OFF | 07/08 | 75 |
| ▲ Improved Execution of cube subset instructions (CSI) | ON | 09/08 | 64 |
| ▲ Parallel Execution of cube subset instructions (CSI) | OFF | 10/03/2017 | 95 |
| ▲ Caching->Auxiliary Caches->Objects->Server->Max. RAM usage (Mbytes) | Multiple | 04/12 | 70 |
| ▲ Caching->Auxiliary Caches->Elements->Server->Max. RAM usage (Mbytes) | 1 | 04/21 | 95 |
| ▲ Governing Rules->File Generation->XML Generation->Max. Memory Consumption for XML Files (MB) | 95 | 12/09/2017 | 95 |
| ▲ Governing Rules->File Generation->PDF Generation->Max. Memory Consumption for PDF Files (MB) | Multiple | 04/29 | 75 |
| ▲ Governing Rules->File Generation->Excel Generation->Max. Memory Consumption for Excel Files (MB) | Multiple | 05/11 | 90 |
| ▲ Governing Rules->File Generation->Excel Generation->Max. Memory Consumption of HTML Files (MB) | 95 | 07/30 | 95 |
| ▲ Caching->Auxiliary Caches->Objects->Server->Max. RAM usage (Mbytes) | Multiple | 04/12 | 70 |
| ▲ Caching->Auxiliary Caches->Elements->Server->Max. RAM usage (Mbytes) | 1 | 04/21 | 96 |
| ▲ Governing Rules->File Generation->XML Generation->Max. Memory Consumption for XML Files (MB) | 95 | 12/09/2017 | 95 |
| ▲ Governing Rules->File Generation->PDF Generation->Max. Memory Consumption for PDF Files (MB) | 95 | 04/29 | 75 |
| ▲ Governing Rules->File Generation->Excel Generation->Max. Memory Consumption for Excel Files (MB) | 95 | 05/11 | 90 |

220

Sidebar:
- My Library
- Recent Documents
- Applications (25)
- Multiple Value (10)
- Intelligence Server (147)
- Dossiers
- Documents
- Reports
  - Web (89)
  - Mobile (45)
- Datasets

ENTERPRISE
- Environments
  - Library (30)
  - Collaboration (40)
  - Data Server (23)
  - Network Manager (12)
  - Platform Analytics (34)
- Topology
- Certificates
- License

CMS
- Users & Groups

GATEWAYS
- Physical Gateways
- Logical Gateways

RESOURCES 210
- Getting Started
- Community

CENTRALIZED PLATFORM MANAGEMENT FOR COMPUTING ENVIRONMENTS

TECHNICAL FIELD

This specification generally relates management of computing environments.

BACKGROUND

As the number of managed computing environments increases, improved methods for managing and configuring multiple environments are needed to provide greater system efficiency and improved user experience.

SUMMARY

In some implementations, a management system provides the ability to monitor and manipulate settings for various computing environments. For example, a centralized platform management system can monitor one or more server environments and record the settings, hardware resources, and load conditions of the server environments. The management system can also change the configuration of the server environments remotely, based on input from an administrator or through automated processes. The management system can monitor and control computing environments at various different levels, for example, for individual computing environments, for groups of multiple computing environments across an organization, or across computing environments of different organizations. The management system can manage multiple computing environments by, for example, spinning-up, tearing-down, cloning, upgrading, validating, and monitoring the computing environments. The ability of the management system to obtain, store, and alter configuration settings of different computing environments facilitates the transfer or replication of settings from one computing environment to another. The management system can provide access to the management functionality through an interface, such as a user interface or application programming interface (API), allowing remote management Managing multiple computing environments can be burdensome for a platform administrator. In many cases, administrators may need to manually update settings for each computing environment individually, through separate interfaces and separate login credentials. Many systems do not allow the configuration of one computing environment to be easily replicated at other computing environments. As a result, many computing environments do not have their configurations optimized or updated in the manner needed or as quickly as needed. The management techniques discussed herein can significantly improve the process of monitoring, testing, and updating configurations of computing environments, greatly reducing the number of manual actions required by the administrator. The techniques also provide for greater consistency and predictability across computing environments. For example, the management system can enable an administrator to specify a configuration and remotely apply the configuration to any or all of multiple computing environments. As another example, the management system can also transfer or duplicate the configuration settings of one computing environment to one or more other existing computing environments.

In some implementations, a management system maintains a registry of multiple computing environments that communicate with the management system over a network. The management system monitors actions at the managed environments, stores data indicating configurations and detected actions in a repository, and can initiate various actions at the environments, such as configuration changes, execution of workflows, performance tests, etc. The management system provides data for an interface that presents aggregated information about and controls to adjust the managed environments. For example, the management system can provide data that allows a single application to display and change settings, configurations, and applications aggregated across many computing environments. The management system can monitor and manage many aspects of a computing environment, including users, groups, permissions, data privacy, security, access control, and license usage. The management system can also manage multiple computing environments to simplify processes for auditing. For example, the management system can perform audits of actions and settings relating to, among other aspects, users, groups, permissions, data privacy, security, access control, and license usage for various computing environments.

In general, the management system can remotely control each computing environment to adjust settings and configurations, for example, over a local area network and/or over a wide area network such as the Internet. The management system can monitor and react to events and changes at each computing environment, and keep the computing environment's settings and configuration up-to-date.

A management system can monitor and compare the performance of multiple environments. The management system can provide visibility into the impact of settings and configuration changes on performance. For example, the management system can track server performance over time, as well as the settings used, so that the management system can determine relationships between changes in settings and performance. The management system can provide a summary or global view of users and their activity.

A management system may provide version control, including storing information indicating different settings that are active at different times at each individual computing environment managed. In some implementations, the management system can also store and manage versions of documents, such as reports, across multiple computing environments. For example, the management system can track which versions are used by different computing environments, and initiate changes to merge changes, roll back undesired changes, or ensure that computing environments use the most up-to-date versions. The management system can store historical information about modifications to settings and configurations, for example, by logging configuration changes for each individual computing environment. The management system can track configuration changes and store versions of configuration information over time, and can revert computing environments to previous configurations when needed.

In one general aspect, a method includes obtaining, by the management system, configuration information for each of multiple computing environments; storing, by the management system, the configuration information for the multiple computing environments in a repository; monitoring, by the management system, actions that change configurations of the multiple computing environments and recording indications of the changes in the repository; and providing, by the management system, an interface configured to provide information about the configurations of the multiple computing environments and to adjust the configurations of the multiple computing environments in response to input received through the interface.

In some implementations, the obtained configuration information indicates settings, users, or applications of the multiple computing environments.

In some implementations, providing the interface includes providing application data, for presentation at a client device, for a user interface of an application to remotely configure each individual computing environment of the multiple computing environments through communication with the management system over a computer network.

In some implementations, monitoring the actions that change the configurations of the multiple computing environments includes: detecting a change in a configuration setting of a particular computing environment; determining whether the change in the configuration setting satisfies one or more criteria associated with the particular computing environment; and performing an action selected based on determining whether the change in the configuration setting satisfies one or more criteria associated with the particular computing environment.

In some implementations, the method includes detecting actions at the multiple computing environments; and storing log data indicating the detected actions in the repository.

In some implementations, the method includes: storing, by the management system, policy data indicating one or more policies for a particular computing environment of the multiple computing environments; performing, by the management system, an audit of the particular computing system with respect to the one or more policies indicated by the policy data, performing the audit including determining that a configuration parameter of the particular computing environment, a change to a configuration parameter of the particular computing environment, or an action at the particular computing environment does not satisfy the one or more policies indicated by the policy data; and in response to determining that the configuration parameter, change, or action does not satisfy the one or more policies, causing the particular computing environment to alter the configuration parameter, reverse the change, or undo the action.

In some implementations, causing the particular computing environment to alter the configuration parameter, reverse the change, or undo the action is performed automatically by the management system without being requested by a user.

In some implementations, the method includes communicating between the management system and the multiple computing environments using a representational state transfer application programming interface.

In some implementations, the method includes providing management services using a micro-service architecture that has a plurality of container-based modules configured to perform different management tasks.

In some implementations, the container-based modules are software images for software modules configured to run in isolation from each other on a host operating system; the method including: identifying, from among a plurality of management tasks, a management task to perform for a particular computing environment; selecting one of the software modules to perform the identified management task; and performing the management task causing the selected software module to be loaded and run by the management system or by the particular computing environment.

In some implementations, the method includes providing an interface enabling a user to define management tasks and remotely initiate management tasks for individual computing environments, the interface providing functionality to combine a series of management tasks into a workflow and to combine, transfer, or share settings among different computer environments.

In some implementations, the method includes: receiving data indicating a request to replicate at least a portion of a configuration of a first computing environment at a second computing environment; accessing, from the repository, configuration parameters of the first computing environment; and transferring the configuration parameters accessed from the repository to the second computing environment over a network.

In some implementations, the method includes storing, in the repository, configuration information for different versions of settings that were respectively active at a particular computing environment at different times; and providing an interface to apply, to the particular computing environment or another computing environment, any of the different versions of settings that were respectively active at the particular environment at different times.

In some implementations, the method includes providing, by the management system, an interface to define performance tests to be executed for the computing environments; performing a performance test for a particular computing environment; determining, based on the performance test, that the particular computing environment does not provide at least a threshold level of performance; and in response to determining that the particular computing environment does not provide at least the threshold level of performance, causing a notification to be provided or initiating a configuration change for the particular computing environment.

In some implementations, the method includes storing, by the management system, environment data for deploying computer environments, the environment data including software images or installers for creating new computer environments in at least one of local computing hardware, remote computing hardware, virtual machines, containers, or cloud computing platforms; and creating, by the management system, a new computer environment based on the environment data, the new computer environment being created such that the new computing environment is configured to automatically register itself with the management system to be managed by the management system.

In some implementations, the method includes receiving one or more event messages sent to the management system from one or more of the multiple computing environments, the one or more event messages each indicating an action or configuration change at one of the multiple computing environments.

In some implementations, the method includes storing, by the management system, configuration information for multiple configurations of a particular computing environment; and causing, by the management system, the particular computing environment to change among the multiple configurations at different times based on a schedule or conditions detected at the particular computing environment.

In some implementations, the method includes managing, by the management system, the execution of customized workflows for individual computing environments, each of the customized workflows including one or more operations to be performed by a corresponding computing environment.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 2, 3, and 4 illustrate examples of interfaces through which a user may change configurations of multiple computing environments.

Like reference numbers and designations in the various drawings indicate like elements.

DETAILED DESCRIPTION

Figure 1:
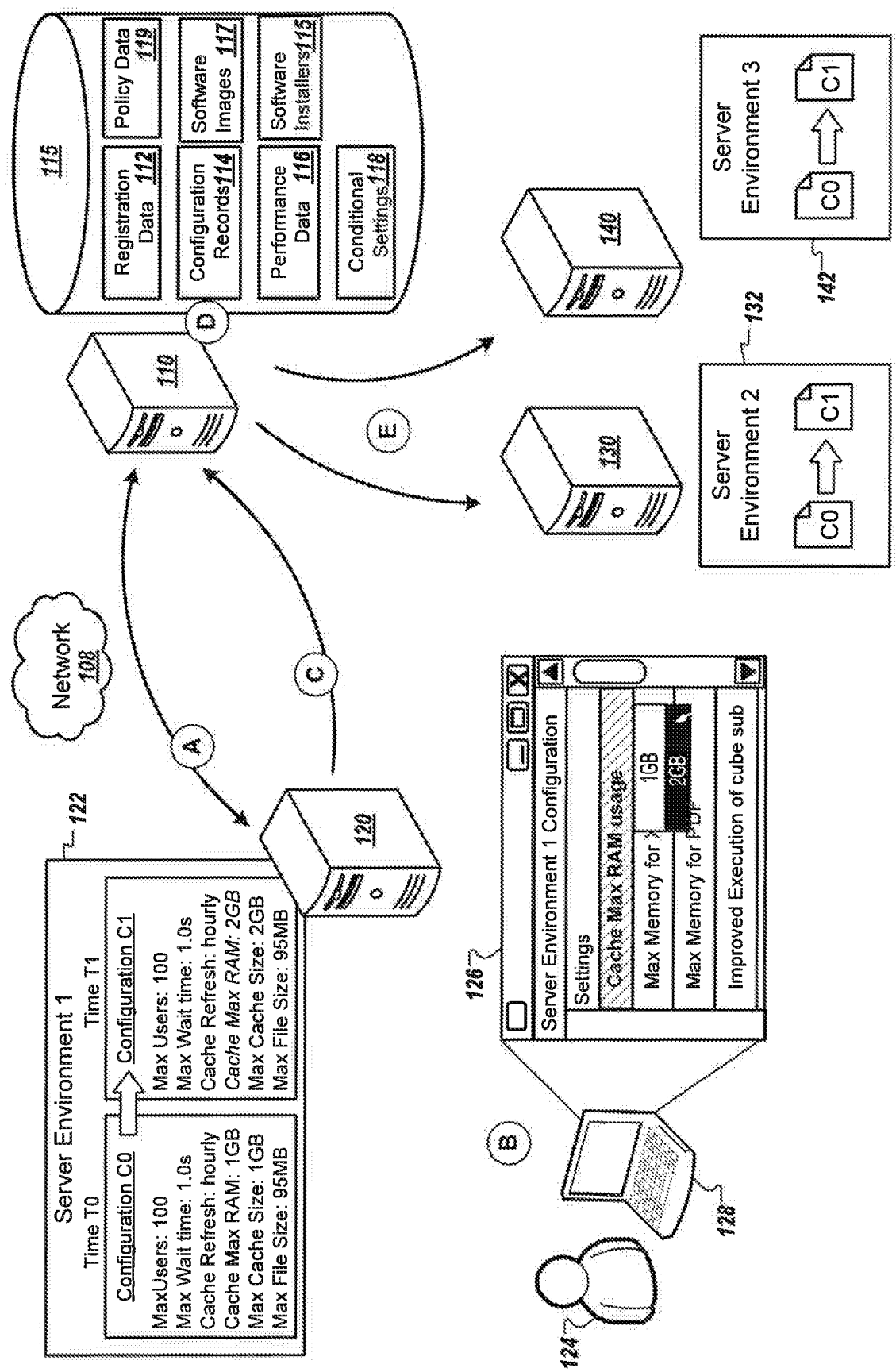
FIG. 1 is a diagram that illustrates an example system for centralized platform management.

FIG. 1 is a diagram that illustrates an example system 100 for centralized platform management. The system 100 includes a management system 110, a first server 120 having a first computing environment 122, a second server 130 having a second computing environment 132, and a third server 140 having a third computing environment 142. In the example of FIG. 1, the computing environments 122, 132, 142 represent separate server environments. Nevertheless, the same techniques can be used to manage settings or operation of other environments, such as mobile devices, desktop computers, laptop computers, wearable devices, etc., as well as systems including multiple devices.

FIG. 1 also illustrates a flow of data, shown as stages (A) to (E), which can represent steps in an example process. Stages (A) to (E) may occur in the illustrated sequence, or in a sequence that is different from the illustrated sequence. For example, some of the stages may occur concurrently.

The example of FIG. 1 shows the management system 110 configured to monitor several computing environments 122, 132, 142. The example shows how the computing environment 122 is initially created and registered with the management system 110, and how the management system 122 can be used to remotely configure the computing environment. The example also shows how settings from one environment 122 can be used to update the settings of other computing environments 132, 142.

As used herein, a computing environment can refer to any of various types of environments, including hardware, software, or both. Examples of computing environments include a local or on-premises computer system, a remote computer system, a computer environment running on a cloud-computing platform, a software environment, a virtualized environment (e.g., one or more virtual machines), and a container-based environment (e.g., one or more containers running on a host machine).

The management system 110 can include one or more computers. The management system 110 can communicate with the other servers and/or computing environments over a network 108. The management system 110 has data storage 115 containing registration data 112 and configuration records 114 for each of the computing environments 122, 132, and 142.

The management system 110 is configured to monitor settings and other configuration information for multiple computing environments 122, 132, and 142. The management system 110 maintains a registry of each environment 122, 132, and 142 to be managed. Information about the registered environments can be stored as registration data 112, which can indicate various aspects about the configuration of managed environments (e.g., hardware capabilities, software versions, network addresses, communication protocols, etc.).

In general, different computing environments may require different user login credentials to allow access. Rather than require a user to enter credentials for each individual computing environment, the management system 110 can delegate authentication processing to an authentication server, such as a single-sign-on system. The authentication server store various trust relationships and mappings between different credentials, allowing the authentication server to determine which environments a user has authorization to access. A user can log in to the management system 110, and once the user has proven his or her identity, the authentication server can check the user's permissions for the environments. The authentication server can also use the stored trust relationships to authenticate the user to the different computing environments managed by the management system 110 as needed. This can occur using, for example, a transitive trust functionality in which the authentication server authenticates the user for a first credential or first computing environment based on established authentication for a second credential or second computing environment that is trusted by the first computing environment. This can avoid the need for the computing environments 122, 132, 142 to all be configured to accept a same central account.

The management system 110 is configured to receive information about the configuration of and actions taken at the computing environments 122, 132, 142. The management system 110 can receive this information on an ongoing basis. For example, the computing environments 122, 132, 142 can be configured to send event messages when certain types of configuration changes or other actions occur. As another example, the computing environments 122, 132, 142 can periodically send reports of their current configurations, or the computing environments 122, 132, 142 can respond to requests for configuration information from the management system 110. The configuration information for each of the various computing environments 122, 132, 142 managed can be stored as configuration records 114. This can include multiple versions of configuration information, including logs of changes, to allow version tracking for the configurations of the computing environments 122, 132, 142. Thus, at least in some implementations, the configuration records 114 contain multiple sets of configuration settings for each environment, including past configuration settings to show the combinations of settings that were active at different times.

Some example settings that can be stored in the configuration records 114 and also adjusted by the management system 110 include enabling an automatic tuning setting, ensuring a working set cache is set to a designated percentage of total memory, disabling a web session recovery feature, and ensuring all performance counters for memory and CPU are enabled. Additional example settings can include a maximum number of messages per user, maximum RAM for intelligent cubes, maximum percent growth of intelligent cubes, and ensuring cube percentage growth by dynamic indexes is above a designated percentage. Other examples of settings can include ensuring core files can be generated correctly and that there is enough space to store in the destination location, ensuring governing settings for the total jobs per server, user, or project match the expected usage of the system, and ensuring that a single allocation memory is set to an expected maximum size for each child process request.

Many data analytics platforms and other computer systems are highly configurable, and so have many different configuration settings that affect behavior of the system and performance. Different configurations have different impacts on computing environments based on the size, usage, and behaviors of the computer environment in question. An example of some common settings that can be configured are listed below. Nevertheless, there are many more settings that can have a major impact on the computing environment's performance. That is one of the reasons that the ability to monitor, store, update, control version information, and enforce policies for configuration settings can be very important. Even obscure settings may have a significant impact for certain customers or computing systems. The settings that are adjusted can be at any of various different levels, e.g., at the level of an application, a service, a server, a project, a file or resource, an operating system, or a network. Similarly, settings of an environment that apply to groups of these, e.g., multiple applications, multiple servers, or across an entire set of networked devices, may be managed and stored.

At the application level, a few example settings include: a setting whether automatic tuning is enabled or disabled; a setting whether an administrative task deletes old messages (e.g., log messages or history messages); a setting whether appropriate software license restrictions are being applied (e.g., limiting a number of CPUs that can be used); and a setting for a number of processing threads used for a different engines or modules.

At the server level, a few example settings include: a setting for a cache for a working data set (e.g., where it is often desirable that the cache is at least 20% of the total memory); a setting to enable performance counters for memory usage, CPU usage, network usage, and other aspects; a setting whether web session recovery features are active (e.g., where it is often desirable to disable for better performance); a setting whether background execution of documents is allowed (e.g., where enabling background execution often provides higher performance); a setting to enable or disable lightweight directory access protocol (LDAP) connection pooling (e.g., where disabling often provides higher performance unless required by the customer LDAP infrastructure); and a setting whether to use a non-multi-threading LDAP library is being used (e.g., where using the single-threaded library often provides higher performance).

At the level of project configuration for an individual project, a few example settings include: a maximum number of historical messages to save per user; settings for analytical engine data joins; a maximum amount of RAM to use for caching data sets; a maximum amount of RAM to use for caching documents; a maximum amount of RAM to use for caching objects at a server; a maximum amount of RAM to use for caching objects at a client device; a maximum amount of RAM to use for caching elements at a server; a maximum amount of RAM to use for caching elements at a client device; a maximum amount of RAM to use for a single data cube or for data cubes collectively; a maximum amount or rate of growth of data cubes or other data sets; a setting whether dynamic sourcing is enabled (e.g., with enabling dynamic sourcing often providing higher performance); a setting whether to generate and store basic statistics; a setting whether to generate and store advanced statistics; locations for storing data sets and corresponding caches; a setting of a number of data warehouse connection threads; and settings to prioritize different requests.

At an operating system level, settings in may be data in an operating system registry file. Additional settings may include file path locations, values of settings, whether registry keys are included in the registry or not, and others.

At a server level, for example, for web servers or those that support mobile devices, examples of settings include: settings about which actions are saved to a history list or are logged; settings for time outs (e.g., where it is often desirable that web servers, database servers, and others have matching timeouts); settings that limit the total jobs per server, user or project (e.g., which can be assessed as to whether they match the expected usage of the system); a virtual machine size (e.g., determining that a java virtual machine is set accordingly to the machine resources and customer usage; settings of a memory contract manager (e.g., a consolidated memory management component); a setting specifying an amount of memory reserved for different processes; and a setting for memory allocations for single memory sets or for child process requests.

At an infrastructure level, a few examples of settings include: settings for file system mounting points; settings for locations and sizes of trash or garbage files; destination locations for storing different files; a setting for cleaning operating system cached memory (e.g., frequency of cleaning, the set of cleaning operations to be performed, etc.); settings for automation scripts; and settings that specify the content of automation scripts.

The management system 110 is able to collect information about the performance of the 122, 132, and 142. This process can include passively receiving status messages from the environments and/or actively initiating tasks for which performance is monitored. The performance information can include performance data 116 for each of the computing environments 122, 132, and 142. Performance data 116 can include information such as server load levels over time, the types of workloads experienced, error rates, and average response times. Performance data can also include calculated performance indicators, such as a relative performance index (RPI). The RPI can be a performance score that is normalized to for a standard level of load and hardware resources, thus reducing or removing the effects of different hardware allocations or load levels to make comparisons between systems more appropriate. In some implementations, the performance data 116 includes performance results for different combinations of settings and at different times. For example, historical performance test results for different time periods can be stored. The management system 110 can build the repository of performance data 116 over time for many sets of historical configuration records 114.

The data storage 115 can include conditional settings 118 for each computing environment 122, 132, and 142. Even for a single computing environment, a single configuration may not be most appropriate under all conditions and situations. The management system 110 can store rules and other data that indicate when settings changes are appropriate. The management system 110 can then automatically alter the configuration of a computing environment as indicated by the rules. For example, conditional settings 118 may specify that a first set of settings is generally used, but that at certain times or under certain conditions, a second set of settings should be used instead, e.g., to optimize viewing reports at designated times of the day when large numbers of users typically access reports. As another example, conditional settings 118 specify settings that are optimized for loading online analytical processing (OLAP) data cubes at specific times of the day, but specify settings to maximize response times for user requests at other times. The conditional settings 118 may be dependent on various factors, e.g., geographical locations of servers, patterns of user demand, detected conditions at an environment, current and historical loads, automatically or manually defined thresholds, etc. The conditional settings 118 can include configurations that apply a combination of changes to settings of individual computing environments or to settings of multiple computing environments.

Along with the conditional settings 118, the data storage 115 can store policy data 119 that indicates policies for managed computing environments. For example, some computing environments may have policies that require certain settings to maintain security, data integrity, and so on. The management system 110 can enforce these policies by monitoring changes to settings, checking the settings changes with respect to the appropriate policies, and then denying or reversing changes that do not comply with the applicable policies. The management system 110 can also perform audits, periodically or on-demand, to check the configurations of computer environments with respect to their applicable policies.

One or more of the servers 120, 130, 140 may be a cloud computing system. A cloud computing system may be part of a cloud computing platform (e.g., Amazon Web Services (AWS), Microsoft Azure, etc.) and can host a virtual, cloud-based environment.

The first server 120 can include one or more computers and can communicate with the management system 110 over the network 108. The first server 120 manages/hosts the first computing environment 122.

The second server 130 can include one or more computers and can communicate with the management system 110 over the network 108. The second server 130 manages/hosts the second computing environment 132.

The third server 140 can include one or more computers and can communicate with the management system 110 over the network 108. The third server 140 manages/hosts the third computing environment 142.

The first server 120, the second server 130, and/or the third server 140 communicate with the management system 110 over the network 108, which can include public and/or private networks and can include the Internet.

The techniques disclosed in this document can adjust configurations of computing environments while reducing or eliminating the need for manual configuration changes. For example, the configuration of one server can be adjusted and managed based on the configurations for other servers. Configuration settings can be distributed and applied to many different servers, including servers operated by different third parties or organizations.

The management system 110 provides one or more interfaces to send information about the monitored computing environments as well as receive input specifying changes to make to the configurations. The interface can be provided as an application, dashboard, web page, web application, API, etc. For example, the management system 110 can provide data to support an application for centralized platform management of the registered computing environments. The application can be run or accessed through a user device 128, where aggregated information about any or all of the settings, users, and programs for managed computing environments can be presented. The management system 110 can communicate with the application to receive control instructions through the interface, and then remotely control each environment in response. On an ongoing basis, the management system 110 can monitor and react to events on each computing environment managed.

The following example illustrates some of the capabilities of the management system, starting with the ability to create and register new computing environments to be monitored. As shown in FIG. 1, in stage (A), the management system 110 is used to start a new computing environment 122 hosted by the first server 120. The new computing environment 122 can be created by the management system 110 automatically, such as in response to a rule or conditional setting 118. For example, the management system 110 may be configured by an administrator to automatically create a new environment when a load level for a certain type of task exceeds a threshold. As another example, a user may use the interface to the management system 110 to manually initiate the creation of the new environment 122.

The computing environment 122 can be created based on one or more software images 117 stored by the management system 110, e.g., one of the software images 117 can be loaded and made active. As another example, one of various software installers 115 may cause a certain set of software to be installed at the server 120 to create the environment 122. When the management system 110 creates an environment, the software environment can be configured to automatically register itself with the management system 110. When the first computing environment 122 has initialized and becomes active, the first computing environment 122 initiates communication over the network 108 with registration functionality system of a management system 110. The first computing environment 122 identifies the management system 110, and registers itself with the management system 110.

In response to the first computing environment 122 registering with the management system 110, the management system 110 requests registration data 112 from the first computing environment 122. For example, the management system 110 may request registration data 112 from the first computing environment 122 including configurations and capabilities of the first computing environment 122 and the first server 120. The registration data 112 may include a license key for one or more applications. The management system 110 stores the registration data 112 in the database 115. The database 115 also stores registration data 112 for additional computing environments registered with the management system 110, e.g., the second computing environment 132 and the third computing environment 142.

At stage (B), a user 124 adjusts one or more settings of the first computing environment 122. In this instance, the user 124 makes the change directly, without using the centralized management system 110. As discussed below, the management system 110 can detect and validate the change and take other actions as it determines appropriate. The user 124 can adjust settings of the first computing environment 122, e.g., through a user interface 126 on a user device 128. The user device 128 may be a computing device, such as a laptop, a desktop computer, a mobile computing device, etc. The user device 128 is able to communicate with the management system 110 through, for example, the network 108. Here, the user interface 126 is a graphical user interface (GUI). In other implementations, the user interface 126 may be another interface, such as a voice interface with an audible output through a speaker, with the user device 128 having a microphone to detect a verbal response from the user 124.

At a first time T0, the computing environments 122, 132, and 142 each have configuration C0. In general, the configuration of a computing environment refers to a group or combination of settings or other operating parameters that are being used. The configuration C0 includes settings for a maximum number of users, a maximum wait time, a cache refresh rate, cache maximum RAM usage, maximum cache size, and maximum file size. The configuration C0 includes a cache maximum RAM usage setting of 1 GB.

The configuration C0 may include additional settings such as network settings, thresholds, limits for concurrency of operations, limits on user subscriptions, and so on. For example, the configuration C0 may include a maximum number of rows of data that can be returned, a maximum number of rows of data that can be retrieved, a limit to the number of concurrent operations for a given user and/or project, a limit to the number of interactive operations that can be processed at a time, a limit to the number of scheduled operations that can be processed at a time, etc. As another example, the configuration C1 may include a limit to the number of execution requests that a user can subscribe to, a limit to the number of cache updates that a user can subscribe to, a limit to the number of email subscriptions that a user can subscribe to, a limit to the number of files that a user can subscribe to, a limit to the number of personal views that can be created, a limit to the number of reports and/or documents that a user can subscribe to, etc. As another example, the configuration C1 may include a permission to allow users to import files, e.g. from the Internet using a URL, using an HTTP or HTTPS URL, or using an FTP server, permission to allow users to import data from files on a particular server, etc.

Through the user interface 126, the user 124 may select to change one or more configuration settings of the first computing environment 122. In some implementations, the user interface 126 enables the user 124 to make modifications to the configuration settings using a drop-down menu. For example, the user 124 may use a computer mouse to select the cache maximum RAM usage, and select to change the cache maximum RAM usage from 1 GB to 2 GB.

At time T1, as a result of changes made by the user 124, the server environment 122 has configuration C1. The configuration C1 includes a cache maximum RAM usage of 2 GB, and in this case, a corresponding change in the maximum cache size to 2 GB also. The other settings of configuration C1 remain the same as the configuration C0.

At stage (C), the management system 110 receives data indicating the change to the configuration of the first computing environment, e.g., data indicating the configuration C1 settings from the first server 120. In some examples, the registration process for associating the computing environment 122 with management system 110 subscribes the management system 110 to receive notifications of changes in the computing environment 122, so that the management system 110 receives the configuration C1 settings when the user 124 makes changes to the computing environment 122. In some examples, the management system 110 receives configuration settings from the first server 120 at regular intervals, e.g., once per hour or once per day. As another example, the computing environment 122 can be configured to send an event message to the management system each time a change or action of a certain type occurs.

At stage (D), the management system 110 stores the configuration settings in its data storage 115, illustrated as configuration records 114. The configuration records 114 include time-stamped configurations of the computing environments 122, 132, and 142. In some examples, the management system 110 stores the configuration settings in the data storage 115 at regular intervals, e.g., once per day. The management system 110 can access the configuration records 114 to copy configurations from one computing environment to another. The management system 110 can also access the configuration records 114 to roll back computing environment configurations to previous versions.

The management system 110 can review and analyze histories of configurations within a computing environment. The configuration records 114 can include lists of reports for various computing environments. The management system 110 can access the configuration records 114 to determine which reports are included in which environments. The configuration records 114 can include the most recent version of each report, and the most recent edit date for each report.

The management system 110 can access the configuration records 114 to determine when configurations changed and how configurations changed. The management system 110 can also perform audits of users, groups, and license usage across the computing environments. Based on performing audits, the management system 110 can determine if an underlying computing environment made an unauthorized configuration change. If the management system 110 determines that an underlying computing environment made an unauthorized configuration change, for example a change that violates a policy for the environment indicated in the policy data 119, the management system 110 can roll back the configuration to a previous version. In some examples, the management system 110 may automatically roll back the configuration upon detection of an unauthorized change. In some examples, the management system 110 may send a request and/or a recommendation to an administrator to roll back the configuration to a previous version.

For example, an application may have a license key that specifies a maximum of 100 users. The license key may be stored in the computing environment, e.g., the computing environment 122. The management system 110 can access the license key upon registration as shown in stage (A), and any time there is a change to the configuration. If more than 100 users register for the application, the management system 110 can analyze the configuration to determine that the number of users exceeds the maximum. The management system 110 can then roll back the computing environment 122 to a previous configuration. The management system 110 stores the rolled back configuration settings in its data storage 115 as the configuration records 114.

At stage (E), the management system 110 uses the configuration information obtained for the computing environment 122 to change the configurations of computing environments 132, 142. The management system 110 may determine that a change in the other computer environments 132, 142 is needed for any of various reasons. For example, after analysis of the performance of the environments 122, 132, 142, the management system 110 may determine that the configuration of the environment 122 provides better performance, and so would make the operation of the other environments 132, 142 more efficient. As another example, a user may initiate a change to one environment based on a configuration of another environment using an interface to the management system 110.

In the present example, the management system 110 receives an instruction from a user to replicate the configuration of the environment 122, e.g., the configuration C1, at the computing environments 132, 142. The management system 110 instructs the servers 130, 140 to apply the configuration C1 settings for the second computing environment 132 and the third computing environment 142, respectively.

In some implementations, the first computing environment 122, the second computing environment 132, and/or the third computing environment 142 are production computing environments. Production computing environments are computing environments that are in use, for example, receiving and responding to requests from users. As such, when the management system 110 sends configuration settings to these one or more computing environments, users may be impacted by the resulting effects of those changes. The management system 110 may instruct the servers to apply the configuration C1 when usage is relatively low, such as in the evening, to limit impact on users.

In some implementations, the management system 110 provides the servers 130, 140 a modified version of the configuration C1 settings as part of gradually or incrementally making the change to the configuration C1. For example, the management system 110 may do this by making only part of the change to the existing configuration settings C0 of a particular environment, waiting a period of time, and repeating the process with a further change. For example, the management system 110 may instruct changes in the cache RAM usage from 1 GB to 1.2 GB, then to 1.4 GB, then to 1.6 GB, then to 1.8 GB, then to 2.0 GB. This iterative process may be used when there are significant differences between the existing configuration settings C0 and the configuration C1, and/or when configuration changes are limited by one or more thresholds. This iterative process may be useful when the computing environment is a production environment since significant changes in the computing environment's configuration settings could negatively impact users in some instances. In addition, it gives the management system 110 the opportunity to measure performance at each incremental change and stop or reverse changes if a negative impact on performance is detected.

The management system 110 stores historical information about settings and configurations modifications. The management system tracks and store version changes over time, e.g., as configuration records 114. In some implementations, after modifying the computing environments 132, 142 to configuration C1, the management system 110 may determine to roll back configuration settings to a previous version, e.g., the configuration C0.

For example, the management system 110 may collect performance data 116 for the computing environments 122, 132, 142. The management system can track server performance over time in relation to the change from the configuration C0 to the configuration C1. The management system 110 can compare the performance data 116 with the configuration C1 to historical performance data and the configuration records 114, e.g., with the configuration C0. If the management system 110 determines that the configuration C1 results in poorer performance compared to the configuration C0, the management system 110 can roll back to configuration C0 for one or more of the computing environments 122, 132, 142.

In the example of FIG. 1, the change to the computing environment 122 was made directly, without using the remote control capabilities provided by the management system 110. Nevertheless the same type of changes, as well as others, can be made to individual computing environments or groups of computing environments through a user interface for the management system 110. For example, the user interface 126 could be provided using an application, web page, web application, etc. provided by or supported by the management system 110. The management system 110 can provide user interface data specifying various types of information and interactive controls to present in a user interface. Other types of controls may be presented in a user interface to alter computing environment configurations, such as buttons, menus, context menus, radio buttons, dials, sliders, text entry fields, drag-and-drop targets, and so on. Other examples of interfaces for accessing the functionality of the management system 110 are shown in FIGS. 2-4 and are discussed below.

Figure 3:
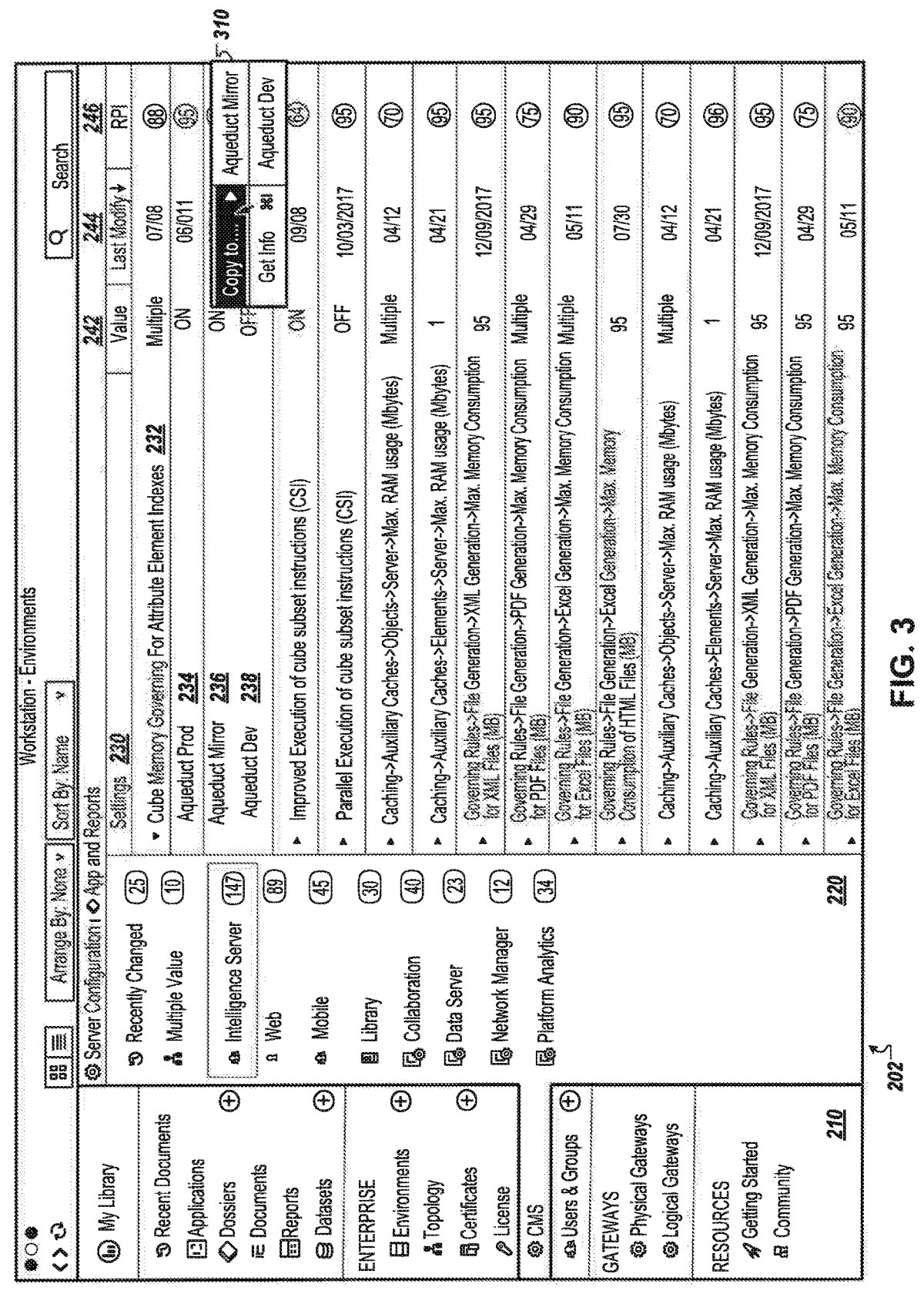
Figure 4:
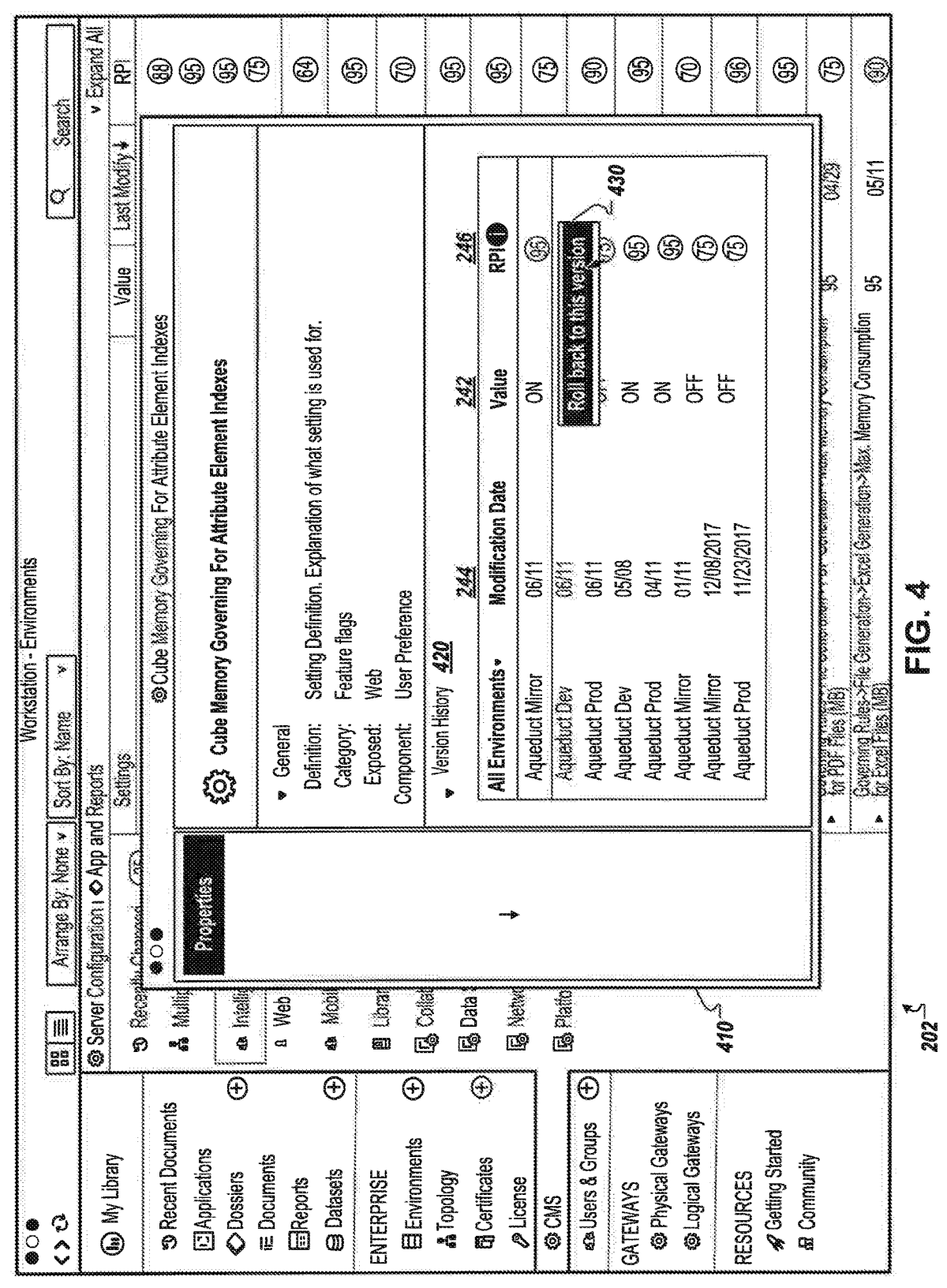

FIGS. 2, 3, and 4 illustrate an interface 202 through which a user may edit settings and configurations of multiple computing environments. The interface 202 may be created by the management system 110 (as shown in FIG. 1) and provided to a user device (e.g., user device 128 as shown in FIG. 1) for display to and/or modification by a user (e.g., user 124 as shown in FIG. 1). The interface 202 includes configurations and settings for multiple computing environments (e.g., the first computing environment 122, the second computing environment 132, and the third computing environment 142 as shown in FIG. 1).

The interface 202 may be divided into one or more portions 210, 220, and 230. In one portion, for example in categories portion 210, a list of categories corresponding to various platforms is displayed. Within each category, a list of various applications can be provided. For example, within the "Enterprise" category, various types of subcategories are listed corresponding to environments, topology, certificates, license, central management system (CMS), and users and groups.

In FIG. 2, the "CMS" subcategory is selected by the user. The CMS subcategory represents the platform through which the management system can configure and manage multiple computing environments. In response to the selection of "CMS," portion 220 is displayed with information indicative of one or more servers. For example, portion 220 displays "Intelligence Server," "Data Server," and "Platform Analytics" servers.

As shown in FIG. 2, "Intelligence Server" is selected by the user. In response to the selection of "Intelligence Server," portion 230 is displayed with information indicative of one or more settings available for environments of the Intelligence Server. For example, portion 230 displays cube subset instruction execution settings, settings for maximum RAM usage of auxiliary caches, and maximum memory consumption for various types of files.

In the illustrated example, the "Cube Memory Governing for Attribute Element Indexes" ("Cube Memory") setting 232 is expanded to display multiple environments. Displayed environments include "Aqueduct Production" 234, "Aqueduct Mirror" 236, and "Aqueduct Development" 238.

The interface 202 displays values 242 of each setting. The values of each setting can be, for example, a setting of "on," "off," a numerical setting, or an indication of multiple settings. The interface 202 also displays a modification date 244 for each setting and a relative performance index (RPI) 246 for each setting. The interface 202 allows the user to edit settings for each environment independently, or to change multiple environments at once.

FIG. 3 illustrates a user editing computing environment settings through the interface 202. Specifically, the user is editing settings for the Intelligence Server. The user selects "Aqueduct Production" 234. In response to the selection, a drop-down menu 310 is displayed. The drop-down menu 310 provides the user with options to copy settings from one environment to other environments. For example, the user has the option to copy the Cube Memory settings 232 from "Aqueduct Production" 234 to "Aqueduct Mirror" 236, "Aqueduct Development" 238, or both. Thus, through the interface 202, the user is able to make changes across multiple environments with a single user action.

FIG. 4 illustrates a user rolling back settings to a previous version through the interface 202. Specifically, the user is rolling back Cube Memory settings for the Intelligence Server. The user selects "Cube Memory Governing for Attribute Element Indexes." In response to the selection, a pop-up menu 410 is displayed. The pop-up menu 410 includes a version history 420. The version history 420 includes a list of versions for the environments "Aqueduct Mirror," "Aqueduct Production," and "Aqueduct Development." The version history 420 also includes a modification date 244, a value 242, and an RPI 246 for each version.

As illustrated in FIG. 4, the user selects the version of "Aqueduct Mirror" that was modified to a value of "ON" on June 11. In response to the selection, a drop-down menu 430 is displayed. The drop-down menu 430 provides the user with an option to roll back the Aqueduct Mirror environment to the June 11 version. This allows the user to roll back combinations of settings to a previous configuration with a single action. The user may roll back the environment to a previous version, for example, if a previous modification was unauthorized. In another example, the user may roll back the environment to a previous version if the previous modification resulted in poorer performance results for the computing environment.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by a management system comprising one or more computers, the method comprising:
    obtaining, by the management system, configuration information for each of multiple computing environments, the configuration information including configuration parameters for each of the multiple computing environments;
    storing, by the management system, the configuration information for the multiple computing environments in a repository;
    monitoring, by the management system, actions that change configurations of the multiple computing environments and recording indications of the changes in the repository such that the repository stores, for each of the multiple computing environments, multiple sets of configuration information that indicate configurations that were active at different times and respective performance measures indicating performance resulting from use of the configurations;
    determining that a condition of a first computing environment satisfies criteria for changing at least one configuration parameter of the first computing environment;
    in response to determining that the condition of the first computing environment satisfies criteria for changing at least one configuration parameter of the first computing environment, selecting a set of configuration information from among multiple sets of configuration information stored for a second computing environment of the multiple computing environments;
    retrieving, from the repository, the selected set of stored configuration information for the second computing environment;
    adjusting the at least one configuration parameter of the first computing environment by selectively transferring a subset of configuration parameters from the retrieved set of stored configuration information for the second computing environment to the first computing environment;
    determining that a condition of the multiple computing environments satisfies criteria for creating a new computing environment; and
    in response to determining that the condition of the multiple computing environments satisfies criteria for creating a new computing environment, creating the new computing environment, wherein the new computing environment is configured to:
        automatically self-register with the management system; and
        upon self-registering with the management system, send an event message to the management system in response to detecting a change to the configuration information for the new computing environment, wherein the event message indicates the changed configuration information for the new computing environment.

2. The method of claim 1, wherein the obtained configuration information indicates settings, users, or applications of the multiple computing environments.

3. The method of claim 1, comprising:
    storing, by the management system, policy data indicating one or more policies for the first computing environment of the multiple computing environments;
    wherein determining that the condition of the first computing environment satisfies criteria for changing the at least one configuration parameter of the first computing environment comprises performing, by the management system, an audit of the first computing environment with respect to the one or more policies indicated by the policy data, wherein performing the audit comprises determining that a configuration parameter of the first computing environment, a change to a configuration parameter of the first computing environment, or an action at the first computing environment does not satisfy the one or more policies indicated by the policy data.

4. The method of claim 1, comprising:
providing management services using a micro-service architecture that has a plurality of container-based modules configured to perform different management tasks, wherein the container-based modules are software images for software modules configured to run in isolation from each other on a host operating system;

identifying, from among a plurality of management tasks, a management task to perform for a particular computing environment;
selecting one of the software modules to perform the identified management task; and
performing the management task by causing the selected software module to be loaded and run by the management system or by the particular computing environment.

5. The method of claim 1, comprising providing an interface enabling a user to define management tasks and remotely initiate management tasks for individual computing environments, wherein the interface provides functionality to combine a series of management tasks into a workflow and to combine, transfer, or share settings among different computing environments.

6. The method of claim 1, comprising:
receiving data indicating a request to replicate at least a portion of a configuration of the second computing environment at the first computing environment;
in response to receiving the data indicating the request to replicate at least a portion of the configuration of the second computing environment at the first computing environment, accessing, from the repository, configuration parameters of the second computing environment; and
transferring the configuration parameters accessed from the repository to the first computing environment over a network.

7. The method of claim 1, comprising:
providing, by the management system, an interface to define performance tests to be executed for the multiple computing environments; and
performing a performance test for the first computing environment;
wherein determining that the condition of the first computing environment satisfies criteria for changing at least one configuration parameter of the first computing environment comprises determining, based on the performance test, that the first computing environment does not provide at least a threshold level of performance.

8. The method of claim 1, comprising:
storing, by the management system, environment data for deploying computing environments, wherein the environment data comprises software images or installers for creating new computing environments in at least one of local computing hardware, remote computing hardware, virtual machines, containers, or cloud computing platforms; and
creating, by the management system, the new computing environment based on the environment data.

9. The method of claim 1, comprising managing, by the management system, the execution of customized workflows for individual computing environments, each of the customized workflows comprising one or more operations to be performed by a corresponding computing environment.

10. The method of claim 1, wherein determining that the condition of the first computing environment satisfies criteria for changing at least one configuration parameter of the first computing environment comprises:
based on the respective performance measures indicating performance resulting from use of the configurations, determining that a particular configuration resulted in performance improvement of the second computing environment compared to performance of the first computing environment.

11. The method of claim 1, comprising:
presenting, through an interface, indications of previous configurations for each of the multiple computing environments from the stored multiple sets of configuration information;
based on input provided through the interface, selecting a set of configuration information for the first computing environment that indicates a previous configuration of the first computing environment;
retrieving the selected set of stored configuration information that indicates the previous configuration of the first computing environment; and
adjusting the configuration of the first computing environment to the selected previous configuration by applying the retrieved set of stored configuration information to the first computing environment.

12. The method of claim 1, comprising:
providing, by the management system, an interface configured to provide information that indicates the configurations of the multiple computing environments and indicates the respective performance measures for the configurations, the interface being configured to adjust the configurations of the multiple computing environments in response to input received through the interface;
based on input provided through the interface, selecting a set of configuration information from among multiple sets of configuration information stored for the second computing environment; and
in response to receiving the input provided through the interface, retrieving the selected set of stored configuration information and adjusting the configuration of the first computing environment by applying the retrieved set of stored configuration information to the first computing environment.

13. The method of claim 1, wherein determining that the condition of the first computing environment satisfies criteria for changing the at least one configuration parameter of the first computing environment comprises at least one of:
determining that a load condition of the first computing environment is not within specified load limits for the current configuration of the first computing environment;
determining, based on a schedule, that a current time of day is outside of specified time ranges for the current configuration of the first computing environment;
determining that a user demand of the first computing environment is not within specified limits of user demand for the current configuration of the first computing environment;
determining that an error rate of the first computing environment exceeds a specified threshold error rate; or
determining that a response time of the first computing environment exceeds a specified threshold response time.

14. The method of claim 1, comprising storing, by the management system, historical performance test results indicating performance of the first computing environment at multiple different time periods, wherein determining that the condition of the first computing environment satisfies criteria for changing the at least one configuration parameter of the first computing environment comprises determining that the historical performance test results are not within specified limits of performance test results.

15. The method of claim 1, wherein determining that the condition of the multiple computing environments satisfies the criteria comprises determining that a load level for the multiple computing environments exceeds a threshold load level.

16. The method of claim 1, comprising:
in response to the new computing environment self-registering with the management system, subscribing the management system to receive configuration information from the new computing environment at regular time intervals.

17. The method of claim 1, comprising:
in response to the new computing environment self-registering with the management system, presenting, by the management system and through an interface, information indicative of the configuration of the new computing environment, the management system being configured to adjust the configuration of the new computing environment in response to input received through the interface.

18. A system comprising:
one or more computers; and
one or more computer-readable media storing instructions that, when executed by the one or more computers, cause the one or more computers to perform operations comprising:
  obtaining, by the one or more computers, configuration information for each of multiple computing environments, the configuration information including configuration parameters for each of the multiple computing environments;
  storing, by the one or more computers, the configuration information for the multiple computing environments in a repository;
  monitoring, by the one or more computers, actions that change configurations of the multiple computing environments and recording indications of the changes in the repository such that the repository stores, for each of the multiple computing environments, multiple sets of configuration information that indicate configurations that were active at different times and respective performance measures indicating performance resulting from use of the configurations;
  determining that a condition of a first computing environment satisfies criteria for changing at least one configuration parameter of the first computing environment;
  in response to determining that the condition of the first computing environment satisfies criteria for changing at least one configuration parameter of the first computing environment, selecting a set of configuration information from among multiple sets of configuration information stored for a second computing environment of the multiple computing environments;
  retrieving, from the repository, the selected set of stored configuration information for the second computing environment;
  adjusting the at least one configuration parameter of the first computing environment by selectively transferring a subset of configuration parameters from the retrieved set of stored configuration information for the second computing environment to the first computing environment;
  determining that a condition of the multiple computing environments satisfies criteria for creating a new computing environment; and
  in response to determining that the condition of the multiple computing environments satisfies criteria for creating a new computing environment, creating the new computing environment, wherein the new computing environment is configured to:
    automatically self-register with the management system; and
    upon self-registering with the management system, send an event message to the management system in response to detecting a change to the configuration information for the new computing environment, wherein the event message indicates the changed configuration information for the new computing environment.

19. One or more non-transitory computer-readable media storing instructions that, when executed by one or more computers, cause the one or more computers to perform operations comprising:
  obtaining, by the one or more computers, configuration information for each of multiple computing environments, the configuration information including configuration parameters for each of the multiple computing environments;
  storing, by the one or more computers, the configuration information for the multiple computing environments in a repository;
  monitoring, by the one or more computers, actions that change configurations of the multiple computing environments and recording indications of the changes in the repository such that the repository stores, for each of the multiple computing environments, multiple sets of configuration information that indicate configurations that were active at different times and respective performance measures indicating performance resulting from use of the configurations;
  determining that a condition of a first computing environment satisfies criteria for changing at least one configuration parameter of the first computing environment;
  in response to determining that the condition of the first computing environment satisfies criteria for changing at least one configuration parameter of the first computing environment, selecting a set of configuration information from among multiple sets of configuration information stored for a second computing environment of the multiple computing environments;
  retrieving, from the repository, the selected set of stored configuration information for the second computing environment;
  adjusting the at least one configuration parameter of the first computing environment by selectively transferring a subset of configuration parameters from the retrieved set of stored configuration information for the second computing environment to the first computing environment;
  determining that a condition of the multiple computing environments satisfies criteria for creating a new computing environment; and
  in response to determining that the condition of the multiple computing environments satisfies criteria for creating a new computing environment, creating the new computing environment, wherein the new computing environment is configured to:
    automatically self-register with the management system; and upon self-registering with the management system, send an event message to the management system in response to detecting a change to the configuration information for the new computing environment, wherein the event message indicates the changed configuration information for the new computing environment.

\* \* \* \* \*